L. A. BECHT.
VALVE GEAR FOR MOTORS.
APPLICATION FILED SEPT. 20, 1916.
1,277,363.
Patented Sept. 3, 1918.
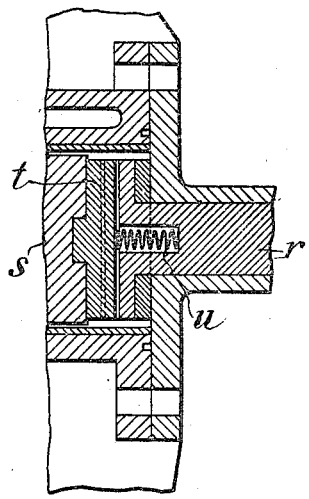
Inventor:
Louis Auguste Becht,
By Attorneys,
Fraser, Twnd Myers

UNITED STATES PATENT OFFICE.

LOUIS AUGUSTE BECHT, OF PARIS, FRANCE.

VALVE-GEAR FOR MOTORS.

1,277,363.  Specification of Letters Patent.  Patented Sept. 3, 1918.

Application filed September 20, 1916. Serial No. 121,150.

*To all whom it may concern:*

Be it known that I, LOUIS AUGUSTE BECHT, a citizen of the Republic of France, residing in Paris, France, have invented certain new and useful Improvements in or Relating to Valve Gears for Motors, of which the following is a specification.

The present invention has for its object the addition of an improvement to the motor which has been described in the French Patent No. 463,677 of October 16, 1913.

This improvement has for its object the suppressing of poundings and consequently all noise in the universal joints controlling the rotary valves.

The improvement will be well understood by means of the figures attached to the present description and given by way of example.

The figure is a partial section of the universal joint control, of a rotating slide valve.

In the figure $r$ represents in section the shaft which controls the rotating valve $s$; $t$ is an intermediate piece provided with a groove and a corresponding rib, arranged crosswise, and which enables the shaft $r$ to drive the universally connected valve $s$, whatever may be the eccentricity thereof produced by the expansion of the valve $s$ as regards its control shaft $r$.

The intermediate piece $t$ has a certain axial play. This play allows the piece $t$ to shift between $r$ and $s$ to strike them alternately and to produce a noise which it is preferable to avoid. For this purpose between the piece $t$ and the one of the adjoining pieces $r$ or $s$ there is arranged a spring $u$ which by suppressing the axial displacements of $t$ suppresses the noise which can result therefrom.

The invention comprises:

In combination a rotary valve, a rotary drive shaft and an intermediate part, said valve, intermediate part and shaft having the relation of a universal joint, and a spring arranged between said intermediate part and one of the other parts, for the purpose of avoiding pounding between said parts.

In witness whereof I have hereunto signed my name in the presence of two subscribing witnesses.

LOUIS AUGUSTE BECHT.

Witnesses:
 CHAS. P. PRESSLY,
 HENRI CARTIER.